(12) United States Patent
You et al.

(10) Patent No.: US 8,601,382 B2
(45) Date of Patent: Dec. 3, 2013

(54) FILE EXECUTION METHOD AND SYSTEM FOR A PORTABLE DEVICE

(75) Inventors: Byeong Gyun You, Suwon-si (KR); Jong Kerl Lee, Gumi-si (KR); Keong Young Park, Busan (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1321 days.

(21) Appl. No.: 12/046,834

(22) Filed: Mar. 12, 2008

(65) Prior Publication Data

US 2008/0229201 A1    Sep. 18, 2008

(30) Foreign Application Priority Data

Mar. 12, 2007   (KR) .......................... 10-2007-0024154

(51) Int. Cl.
*G06F 3/048* (2013.01)

(52) U.S. Cl.
USPC ............................. 715/762; 715/727; 715/835

(58) Field of Classification Search
USPC ......................................... 715/716, 764, 835
See application file for complete search history.

(56) References Cited

U.S. PATENT DOCUMENTS

| | | | |
|---|---|---|---|
| 7,681,138 B2 * | 3/2010 | Grasser et al. ................. | 715/763 |
| 7,684,828 B2 * | 3/2010 | Lee ................................ | 455/566 |
| 7,730,413 B1 * | 6/2010 | Engel et al. .................... | 715/764 |
| 2001/0017975 A1 * | 8/2001 | Ando et al. ..................... | 386/96 |
| 2002/0045465 A1 * | 4/2002 | Kishida et al. ................. | 455/566 |
| 2003/0105748 A1 * | 6/2003 | Ishida et al. ..................... | 707/3 |
| 2003/0106068 A1 * | 6/2003 | Ishida et al. .................... | 725/134 |
| 2003/0208466 A1 * | 11/2003 | Stern ................................. | 707/1 |
| 2003/0237043 A1 * | 12/2003 | Novak et al. ............... | 715/500.1 |
| 2004/0076230 A1 * | 4/2004 | Tomono ................... | 375/240.01 |
| 2006/0217160 A1 * | 9/2006 | Lee ................................. | 455/566 |
| 2007/0011279 A1 * | 1/2007 | Haklai .......................... | 709/219 |
| 2007/0053246 A1 * | 3/2007 | Sano et al. ................. | 369/30.04 |
| 2007/0182822 A1 * | 8/2007 | Hale et al. ................ | 348/207.99 |
| 2008/0026690 A1 * | 1/2008 | Foxenland .................... | 455/3.06 |
| 2008/0032670 A1 * | 2/2008 | Wada et al. ................. | 455/412.1 |
| 2008/0189656 A1 * | 8/2008 | Abanami et al. .............. | 715/810 |
| 2008/0215999 A1 * | 9/2008 | Kim et al. ..................... | 715/762 |

FOREIGN PATENT DOCUMENTS

| | | |
|---|---|---|
| JP | 2002-351479 A | 12/2002 |
| KR | 10-2005-0113922 A | 12/2005 |
| KR | 10-2007-0017782 A | 2/2007 |
| KR | 10-2007-0043114 A | 4/2007 |

* cited by examiner

*Primary Examiner* — Daeho Song
(74) *Attorney, Agent, or Firm* — Jefferson IP Law, LLP

(57) ABSTRACT

A file execution method and system for a portable device for expediting an execution of files is provided. A method for executing an audio file including at least one track associated with a cover image includes displaying a first cover image associated with a track that is playing and displaying a first track list on the first cover image in response to a first key input signal, the first track list listing tracks associated with the first cover image. The portable device implemented with the file execution method and system of the present invention enables a track list to be displayed together with a cover image shared by a set of tracks listed on the track list, thereby expediting execution of files.

17 Claims, 6 Drawing Sheets

FILE EXECUTION METHOD AND SYSTEM FOR A PORTABLE DEVICE

PRIORITY

This application claims the benefit under 35 U.S.C. §119 (a) of a Korean patent application filed in the Korean Intellectual Property Office on Mar. 12, 2007 and assigned Ser. No. 2007-0024154, the entire disclosure of which is hereby incorporated by reference.

BACKGROUND OF THE INVENTION

1. Field of the Invention present invention relates to a portable device. More particularly, the present invention relates to a file execution method and system for a portable device that is capable of intuitively executing a file by selecting the file from a track list displayed on a screen interface together with a cover image shared by the files, thereby expediting execution of specific files.

2. Description of the Related Art

Portability is one of the most important features for mobile devices. Accordingly, significant research and development has been performed for reducing the overall size of devices while improving their memory capability and software. As a result, recent portable devices have been developed having a slim and compact design while maintaining high data capacity and improved performance. Such developments of portable devices have furthered the users' desires for even more useful functions. In order to satisfy these additional desires, mobile devices tend to be equipped with various optional functions. Among them is a multimedia function (such as an audio playback function), which is highly desired and sought by users for the purpose of entertainment.

However, conventional portable devices are limited in storage and display capabilities in comparison with stationary devices such as a desktop terminal. Also, the conventional portable devices are limited in key input functionality due to their size.

For these reasons, there is a need for an improved file execution mechanism appropriate for portable devices having a limited display size, storage, and key input means.

SUMMARY OF THE INVENTION

An aspect of the present invention is to address at least the above-mentioned problems and/or disadvantages and to provide at least the advantages described below. Accordingly, an aspect of the present invention is to provide a file execution method and system for a portable device that is capable of expediting file search and selection, resulting in fast file execution.

In accordance with an aspect of the present invention, a method for executing an audio file including at least one track associated with a cover image is provided. The method includes displaying a first cover image associated with a track that is playing, and displaying a first track list on the first cover image in response to a first key input signal, the first track list listing tracks associated with the first cover image. In accordance with another aspect of the present invention, a portable device displaying a cover image associated with a track is provided. The portable device includes a display unit for displaying a cover image, an audio processing unit for playing a track associated with the cover image, a memory unit for storing the cover image and the track, and a control unit for controlling the display unit to display the cover image and to display a first track list on the cover image in response to a first input signal, the track list listing tracks associated with the cover image.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

Figure 1:
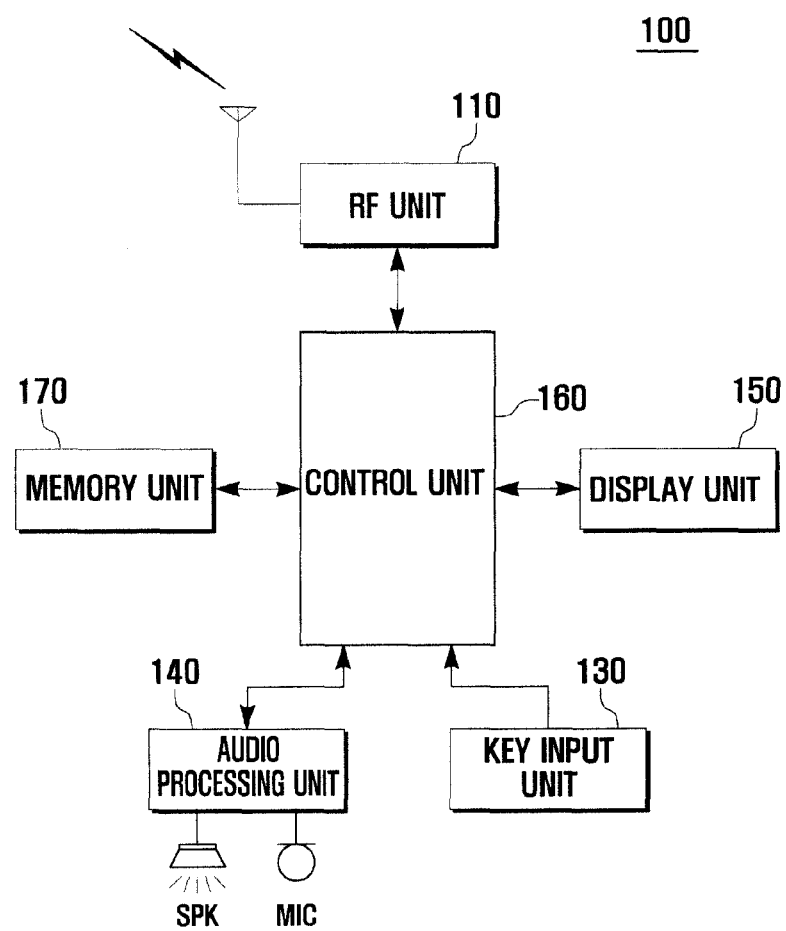
FIG. 1 is a block diagram illustrating a configuration of a portable device according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Certain terminologies are used in the following description for convenience and reference only and are not to be construed as limiting. In the following description, exemplary embodiments of the present invention have been shown and described, by way of illustration of the best mode contemplated by the inventors of carrying out the invention. As will be realized, the invention is capable of modification in various obvious respects, all without departing from the invention. Accordingly, the drawings and descriptions are to be regarded as illustrative in nature and not restrictive.

For example, although the file execution method and system are explained in association with an operation of audio files in the following description, the present invention is not limited thereto. That is, the file execution method and system of the present invention can be applied for executing various types of files such as video and text files as well as the audio files. Also, the portable device implemented with the file execution method and system of the exemplary embodiments of the present invention provide a user interface displaying information associated with various types of files that can be stored in a portable device, simultaneously, such that a user can quickly access the information related to the files and retrieve a target file or file list. Accordingly, various modifications of the present invention in addition to those described herein will become apparent to those skilled in the art and such modifications are intended to fall within the scope of the appended claims and their equivalents.

In order to clarify and assist in understanding the exemplary embodiments of the present invention, the term "track" is used in regard to an audio file. Tracks can be categorized by album, playlist, artist, genre, and date. In particular, each track may be associated with an image, e.g. a cover image of an album or playlist to which the track belongs. Here, the cover image is linked to tracks corresponding to the album or playlist so as to be displayed while any of the tracks are playing. Also, the cover image may be designated by track and may be linked to multiple tracks. The cover image may be configured so as to be displayed in response to a key input by the user at the start time of the track and/or while the track is playing.

Furthermore, the file execution method and system of exemplary embodiments of the present invention can be applied to any portable device that can store specific files associated with a cover image and display the cover image together with the tracks associated with the cover image. The portable device can be any of a mobile terminal, a digital broadcast receiver, a Personal Digital Assistant (PDA), a Smartphone, a 3rd generation (3G) terminal (representing International Mobile Telecommunication 2000 (IMT-2000), Wideband Code Division Multiple Access (CDMA), Universal Mobile Telecommunication Service (UMTS) terminals), a wireless broadband (WiBro) terminal, a High Speed Downlink Packet Access (HSDPA) terminal, other mobile communication and multimedia devices, and their equivalents.

FIG. 1 is a block diagram illustrating a configuration of a portable device according to an exemplary embodiment of the present invention.

Referring to FIG. 1, the portable device 100 includes a key input unit 130, an audio processing unit 140, a control unit 160, a memory unit 170, and a display unit 150. In a case where the portable device 100 is a mobile communication terminal, the portable device further includes radio frequency (RF) unit 110.

The RF unit 110, if included, performs a wireless communication function of the portable device 100. The RF unit 110 includes an RF transmitter for up-converting the frequency of a signal to be transmitted and for amplifying the signal. The RF unit 110 also includes an RF receiver for low-noise amplifying a received signal and for down-converting the frequency of the signal.

The key input unit 130 is provided with a plurality of alphanumeric keys for inputting alphanumeric characters and function keys for executing a variety of processes. The function keys can be implemented in the form of additional navigation keys, side keys, shortcut keys, and the like. The key input unit 130 provides user input to the control unit 160.

In particular, the key input unit 130 of the portable device according to an exemplary embodiment is configured to generate key signals for executing a multimedia application, selecting a track or a track list, and for controlling playback of the track (i.e., play, fast forward, rewind, pause, stop, etc.). The track selection signal may include a cover image call signal and track list display signal for displaying a specific track list together with the cover image associated with the track list.

The audio processing unit 140 processes an audio signal such as voice to be output in the form of an audible sound through a speaker (SPK) and transfers the sounds collected through a microphone (MIC) to the control unit 160. In an exemplary implementation, the audio processing unit 140 processes the track in response to a user input for selecting a track from the track list displayed on the screen of the display unit 150.

The control unit 160 is responsible for controlling general operations of the portable device and for signaling among the internal components. The control unit 160 may be implemented with modem and codec functionalities.

In particular, the control unit 160 controls the display unit 150 to display an interface screen for selecting a track in response to a key signal input through the key input unit 130. If a track is selected to be played in response to the key signal, the control unit 160 controls such that the cover image associated with the selected track is displayed on the screen of the display unit 150. If a key input for calling a track list is detected while playing the previously selected track, the control unit 160 controls such that the track list is visually overlapped onto the corresponding cover image. Preferably, the cover image is displayed as being blurred and the track list is displayed clearly, thereby improving legibility.

The control unit 160 also can control such that the current cover image associated with the track list may be replaced by another cover image and track list in response to a key input signal. That is, when a cover image switching signal is detected, the control unit 160 controls such the current cover image is replaced by another cover image corresponding to its track list on the screen. In the meantime, each track presented on the current cover image can be selected by navigating a cursor across the track list using a wheel key or a navigation key, such as a vertical navigation key. The cover image shift signal can be generated by selecting the wheel key or a navigation key, such as a horizontal navigation key.

If a track selection signal is detected on the current cover image, the control unit 160 controls the audio processing unit 140 to play the selected track.

The memory unit 170 stores a plurality of application programs having respective interface screens, particularly the cover image display application enabling the selection of tracks on the cover image according to this exemplary embodiment. The memory unit 170 also stores a sound playback application for playing the tracks. The memory unit 170 is provided with a program region and a data region.

The program region is configured to the operating system for booting the portable device, multimedia playback application programs, and other application programs required for executing optional functions of the portable device, such as sound and still and motion image outputs. In particular, the program region stores an MP3 application for playing MP3 files, i.e. the tracks. The program region also stores the cover image presentation application for displaying the track lists together with the corresponding cover images.

The data region is configured to store the application data such as audio, video, and text files. Preferably, the audio files are the sound tracks. The tracks stored within the data region may include various information including corresponding cover images. That is, each track may be stored together with one or more of a song title, lyric, genre, album title, playlist title, signer, and cover image of the album or playlist. Since an album or playlist may include a plurality of tracks, the tracks contained in the same album or playlist share the identical cover image. The cover image can be displayed on the screen of the display unit 150 in response to a key signal input though the key input unit 130.

The display unit 150 is configured to display various menu screens associated with the application programs, user input and feedback information. In particular, the display unit 150 provides a screen interface for selecting a track according to this embodiment. The screen interface is described in more detail with reference to FIGS. 2 to 9.

FIGS. 2 to 5 are screen images illustrating steps of a file execution method according to an exemplary embodiment of the present invention.

In order to display the cover image and the track list simultaneously, it is assumed that a screen image displayed on the display unit 150 is composed of dual layers. That is, the screen image is provided with a first layer (bottom layer) for presenting the cover image, and a second layer (top layer) for presenting the track list. However, the present invention is not limited thereto. For example, the file execution system of exemplary embodiments of the present invention can be implemented with a screen image composed of a single layer or more than two layers.

As described above, the display unit 150 distinguishes the data associated with the respective layers of the screen image so as to be overlappingly displayed to the user. At this time, the display unit 150 presents the information on the top layer more legibly than the information on the bottom layer, by increasing any one or more of the resolution, saturation and brightness of the top layer and decreasing any one or more of the resolution, saturation and brightness of the bottom layer. The visual characteristics of resolution, saturation and brightness are used herein by way of example. However, any other visual characteristic or combination of visual characteristics may be used that enable visual distinction.

Figure 2:
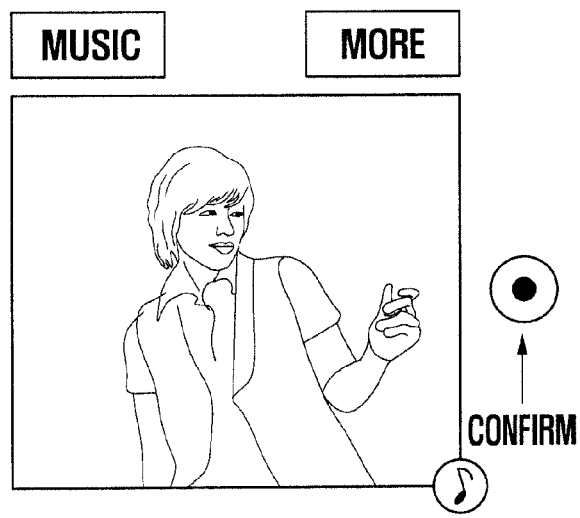
FIG. 2 is a screen image illustrating a step of displaying a cover image according to an exemplary embodiment of the present invention.

Referring to FIG. 2, here the display unit 150 displays a cover image. That is, if a key input is detected for selecting a specific track stored in the memory unit 170, the control unit 160 controls the audio processing unit 140 to start playing the track and controls the display unit 150 to display the cover image associated with the selected track. The cover image can be contained in the file of the track or separately stored. The cover image can be displayed as a full screen image or may be displayed at a specific area on the screen of the display unit.

Figure 3:
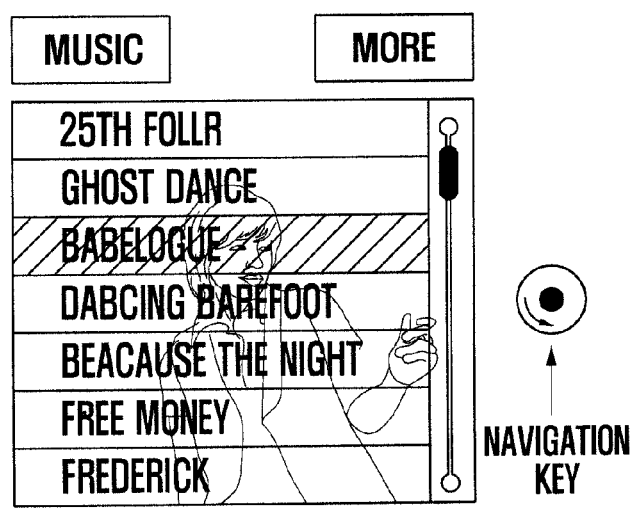
FIG. 3 is a screen image illustrating a step of displaying a track list according to an exemplary embodiment of the present invention.

If a key input for calling a track list is detected while the screen image of FIG. 2 is displayed, the display unit 150 displays a track list screen image as shown in FIG. 3. The track list shows the tracks associated with the displayed cover image.

Referring to FIG. 3, the display unit 150 presents the track list over the cover image. In particular, the display unit 150 displays the cover image on the bottom layer as a background and displays the track list over the top layer. In order to increase the legibility of the track list, any one or more of the resolution, saturation and brightness of the cover image may be reduced. For example, the saturation and/or brightness of the cover image is preferably reduced. That is, the display unit 150 processes the cover image on the bottom layer to be presented dimly in comparison with the track list. The track list may be displayed in the form of any one or more of text, symbols and lines with any one or more of high resolution, high saturation and high brightness. For example, the track list may be displayed with high saturation and high brightness. The track list is displayed clearly on the top layer to improve the legibility. The qualities "dimly" and "clearly" may be adjusted in association with the resolution. If the resolution of the image increases, the image is shown more clearly, and if the resolution of the image decreases, the image is shown more dimly. However, the present invention is not limited thereto and various techniques for increasing the legibility of the track list can be used.

Figure 4:
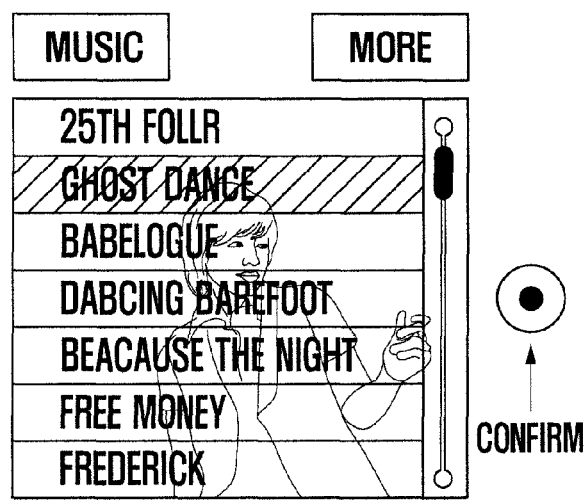
FIG. 4 is a screen image illustrating a step of selecting a track according to an exemplary embodiment of the present invention.

If a key input (e.g., a navigation key input) is detected while displaying the track list on the cover image, the control unit 160 controls the display unit 150 to display the navigation of the cursor across the track list such that a track item on which the cursor is position is highlighted as shown in FIG. 4. However, the navigation of the cursor across the track list may be visually delineated in any other manner.

Referring to FIG. 4, the cursor has moved from a previous track item "BABELOGUE" to a track item "GHOST DANCE."

Figure 5:
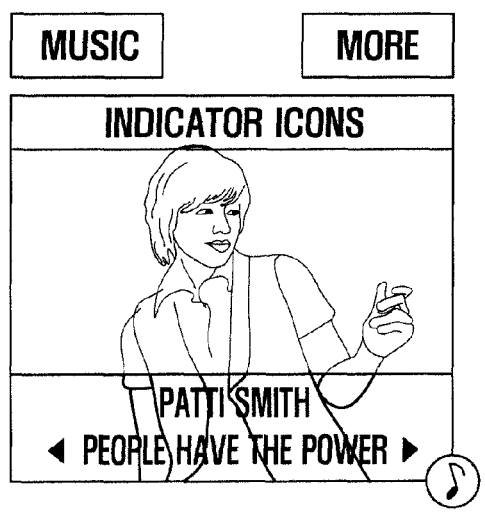
FIG. 5 is a screen image illustrating a step of displaying track information according to an exemplary embodiment of the present invention.

If a key input for selecting a track is detected while the cursor is positioned on the track item "GHOST DANCE," the control unit 160 controls to start playing the track "GHOST DANCE" and displays the cover image associated with the track on the screen of the display unit 150 as shown in FIG. 5.

Referring to FIG. 5, if a track is selected, the display unit 150 displays the cover image together with track information. The cover image may be displayed while the selected track plays. The current track information may be presented at one side of the cover image. In particular, the display unit 150 displays the cover image on the bottom layer and displays the current track information on the top layer. Here, the top layer can be partially formed at the upper and lower sides of the screen. The bottom layer can be configured to maintain the original saturation, brightness, and/or resolution of the cover image at its middle portion on which the top layer is not formed, and to decrease the saturation, brightness, and/or resolution of the cover image at its upper and lower side portions on which the top layer is formed. The top layer is configured to present the information associated with the track such as the lyric and singer.

The track information can be configured to be displayed during the playback of the current track or can be discontinued after a preset period from the start point of the playback of the track.

As described above, the file execution method and system according to an exemplary embodiment of the present invention enables displaying a track list on the cover image associated with the track currently being played back. Accordingly, it is possible to intuitively view the cover image information which is displayed on the bottom layer and is associated with the tracks shown in the track list. Also, the file execution method and system exchanges the top and bottom layers such that the cover image is presented on the top layer once a track is selected from the track list, thereby reducing the load required for processing the cover image.

FIGS. 6 to 9 are screen images illustrating steps of a file execution method according to another exemplary embodiment of the present invention.

Figure 6:
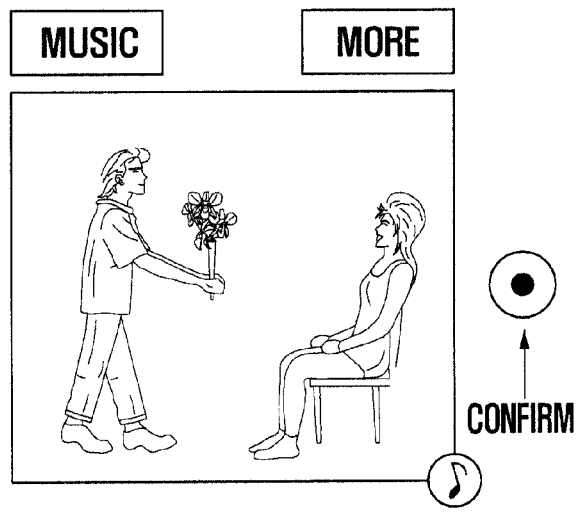
FIG. 6 is a screen image illustrating a step of displaying a cover image according to another exemplary embodiment of the present invention.

Referring to FIG. 6, the display unit 150 displays a first cover image. The first cover image is displayed on the screen of the display unit 150 during the playback of a track selected from the memory.

Figure 7:
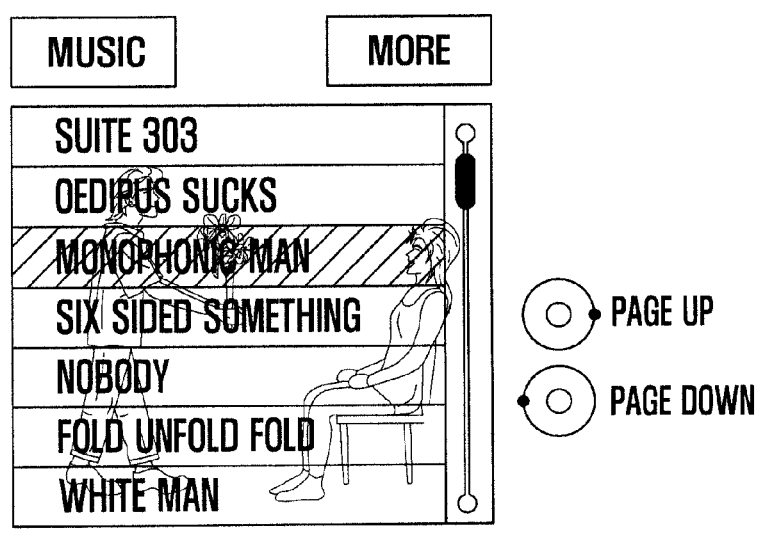
FIG. 7 is a screen image illustrating a step of displaying a track list according to another exemplary embodiment of the present invention.

If a key input is detected for selecting another track associated with the first cover image, e.g. a "confirm" key is detected, a track list is displayed on the first cover image as shown in FIG. 7.

Referring to FIG. 7, a first track list is presented on the first cover image. That is, the first cover image is presented on the bottom layer, and the first track list is presented on the bottom layer. At this time, the first cover image is displayed with any one or more of a low resolution level, a low saturation level and a low brightness level, and the first track list is displayed at any one or more of a high resolution level, a high saturation level and a high brightness level for improving legibility. The navigation across the track items on the track list can be visually determined by the position of a cursor which moves in response to a key input of the navigation keys.

Figure 8:
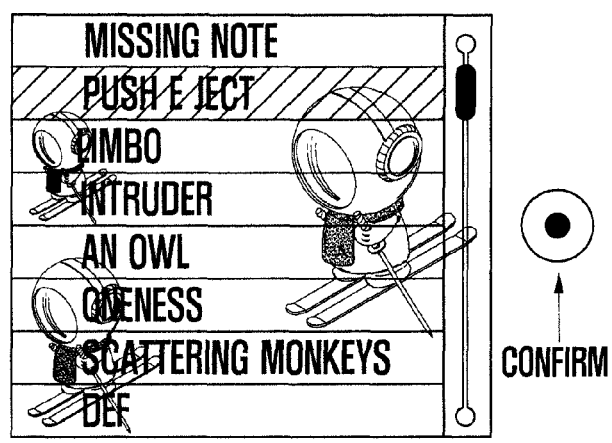
FIG. 8 is a screen image illustrating a step of selecting a track according to another exemplary embodiment of the present invention.

If a page shift key input (e.g., a page up or page down key input) is detected while the first track list is displayed on the first cover image, the display unit 150 displays a screen composed of a second track list overlapped on a second cover image as shown in FIG. 8. Here, the second cover image is an image representing another album or playlist. That is, the second cover image may be an image designated for an album or playlist sharing a common feature, such as the same singer, or may not share a common feature. The second track list is a track list showing the tracks linked to the second cover image. In the case where the second cover image represents specific album or playlist information, the track list comprises the tracks contained in the album or playlist. The second cover image and track list are displayed in the same manner as the first cover image and track list.

Figure 9:
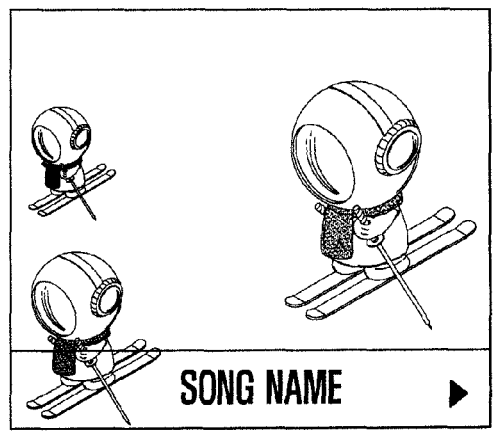
FIG. 9 is a screen image illustrating a step of track information according to another exemplary embodiment of the present invention.

If a track is selected from the second track list on the second cover image and a confirm key is detected, the selected track plays and the second cover image is displayed on the top layer as shown in FIG. 9. In particular, if a track is selected from the second track list on the second cover image, the information on the selected track is displayed at an area of the top layer. The portion of the second cover image in the bottom layer that is displayed in an area not covered by the top layer, is displayed without degradation of any one or more of the original resolution, original saturation and original brightness. The track information can be configured to appear for a preset period. That is, the track information may appear at the start of the playback of the track and may disappear after a preset time.

As described above, in the file execution method and system according to another exemplary embodiment, if a key input for calling another track list is detected while the first track list is displayed on the first cover image, the portable device displays a second track list on a second cover image. Since the mobile terminal displays the track list together with the cover image, the user can expedite retrieval of a target track or a cover image.

In a case where the portable device 100 is a mobile communication terminal, the portable device further includes radio frequency (RF) unit 110. Using the RF unit 110, the portable device 100 can exchange user data with another terminal and download multimedia data such as audio files from a web server, a wireless application protocol (WAP) server or another portable device.

Although the portable device equipped with the file execution system is depicted in the form of a schematic block diagram for simplifying the explanation on its operation as shown in FIG. 1, the present invention is not limited to such configuration. For example, the portable device 100 may further includes at least one of a camera module, a multimedia module, and a digital broadcast receiver module.

Exemplary structures of a portable device implemented with an exemplary file execution system of the present invention have been described above. A file execution method based on the exemplary structures of a portable device described above is described below.

Figure 10:
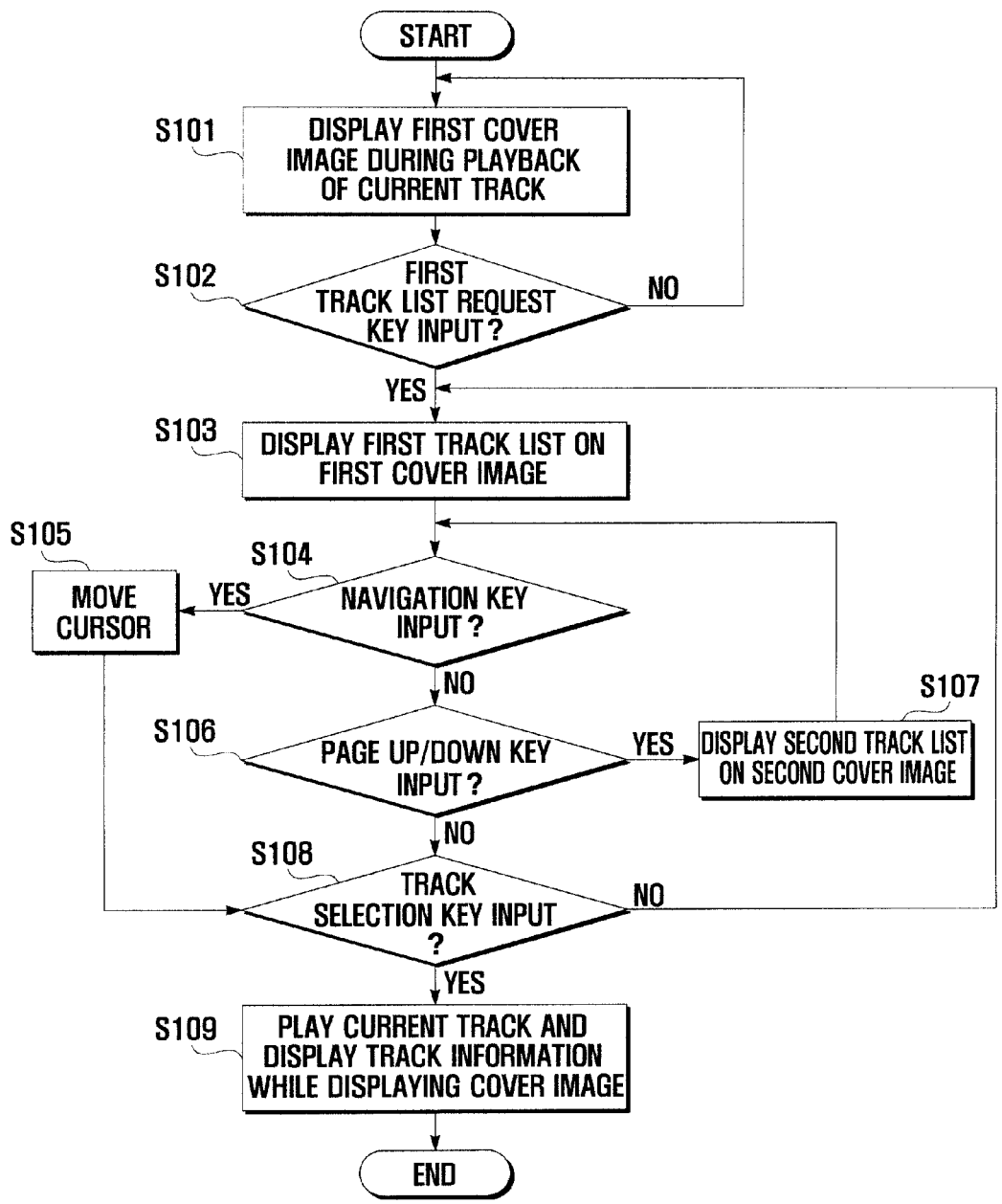
FIG. 10 is a flowchart illustrating a file execution method according to an exemplary embodiment of the present invention.

FIG. 10 is a flowchart illustrating a file execution method for a portable device according to an exemplary embodiment of the present invention.

In this exemplary embodiment, the file execution method is described with sound tracks as files. The tracks can share the information on a specific album or playlist. That is, the tracks are grouped by associations to cover images such that, when a track is selected, a cover image associated with the selected track is displayed on the display unit 150 during the playback of the track.

Referring to FIG. 10, in a file execution method according to an exemplary embodiment, the control unit 160 plays a track in response to a playback key input for the track and displays a first cover image associated with the track on the screen of the display unit 150 in step S101. The first cover image represents an album or playlist to which the current track belongs and includes information on the album or playlist.

Next, the control unit 160 determines whether a key input for requesting a first track list is detected in step S102. That is, the control unit 160 detects key (e.g., "confirm" key) input for listing tracks in association with the first cover image. If a key input is detected while playing the current track, the control unit 160 maintains displaying the first cover image and continues playing the current track.

If a key input for requesting a first track list is detected, the control unit 160 composes a screen image in which the first track list is overlapped on the first cover image in step S103. In particular, the control unit 160 controls such that the first cover image is displayed on a bottom layer of the screen image and the first track list is displayed on a top layer of the screen image. The first cover image on the bottom layer is dimly displayed relative to the first cover image displayed at step S101. Preferably, the first track list is displayed at any one or more of a relatively high resolution level, a high saturation level and a high brightness level, thereby improving legibility. Although the first cover image is displayed on the bottom layer in this exemplary embodiment, the present invention is not limited thereto. For example, the first cover image and the first track list can be displayed on a single layer. If the first cover image and the first track list are displayed on the same layer, the display unit 150 dimly presents the first cover image and the first track list is clearly displayed. The control unit 160 controls such that one of the tracks listed in the first track list, on which a cursor is positioned, is highlighted or visually identified.

Next, the control unit determines whether a navigation key input is detected in step S104. If a navigation key input is detected, the control unit 160 moves the cursor across the first track list track by track in a direction corresponding to the navigation key input in step S105. After moving the cursor, the control unit 160 determines whether a key input for selecting the track is detected in step S108.

If no navigation key input is detected while the first track list is displayed, the control unit 160 determines whether a track list search key (e.g., a page up or page down key) input is detected in step S106.

If a page up/down key input is detected, the control unit 160 controls to display a screen image composed of a second cover image and a second track list overlapped on the second cover image in step S107. That is, the control unit 160 controls to retrieve the second cover image from the memory unit 170 and display the second cover image on the screen of the display unit 150 in response to the page up/down key input. The control unit 160 controls such that the second track list showing the tracks associated with the second cover image is displayed on the second cover image. At this time, the second cover image and track list are displayed in the same manner of the first cover image and track list. After displaying the second track list with the second cover image at step S107, the control unit repeats step S104.

If no page up/down key input is detected in step S106, the control unit 160 determines whether a key input for selecting the track is detected in step S108.

If a key input for selecting the track is detected, the control unit 160 controls to play the track on which the cursor is position and displays the cover image associated with the current playback track together with information on the current track in step S109. At this time, the control unit 160 can control the track information on the entire screen or a part of the screen. The control unit 160 also can control such that the track information is displayed during the playback of the current track or such that it disappears after a preset time has elapsed from the start of the track. The track information is clearly presented on the cover image to improve its legibility. That is, the image is presented less clearly at the area where the cover image and the track information are overlapped and presented normally at the area when no track information is overlapped. If a key input for selecting the track is not detected, the control unit 160 controls repeats step S103.

In the file execution method according to this exemplary embodiment, the steps S104, S106, and S108 can be selectively carried out in a state where the track list is presented on the cover image. However, the present invention is not limited thereto. For example, while the track list is presented on the cover image, step S104 may be followed by step S105, step S106 may be followed by step S107, and step S108 may be followed by step S109. That is, the steps S104, S106, and S108 can be selectively performed in an order of the key events as they occur by the user input. Although steps S108 and S104 are carried out after respectively performing steps S105 and S107 in this exemplary embodiment, the present invention is not limited thereto. For example, steps S105 and S107 can be followed by any of S104, S106, and S108.

The file execution method and system for a portable device according to exemplary embodiments of the present invention, presents the track list on the cover image as a background, thereby expediting a search for tracks linked to the cover image. As described above, the file execution method and system of the present invention enables a fast track search on the track lists associated with respective cover images, thereby quickly retrieving and playing a target track.

While the invention has been shown and described with reference to certain exemplary embodiments thereof, it will be understood by those skilled in the art that various changes in form and details may be made therein without departing from the spirit and scope of the invention as defined by the appended claims and their equivalents.

As described above, the portable device implemented with the file execution method and system of exemplary embodiments of the present invention provide a screen interface that is capable of facilitating a file search.

What is claimed is:

1. A method for executing an audio file including at least one track associated with a cover image, the method comprising:

displaying a first screen in response to a first key input signal, the first screen including a first track list listing tracks associated with a first cover image and the first cover image, the first track list being displayed on a top layer of the first screen disposed above a bottom layer of the first screen, and the cover image being displayed on the bottom layer;

selecting a track from the first track list displayed on the first cover image; and displaying a second screen in response to the selection, the second screen including track information of the selected track and the first cover image, the track information being displayed on a top layer of the second screen disposed above a bottom layer of the second screen, the top layer of the second screen being smaller in size than the bottom layer of the second screen, wherein the first cover image displayed on the second screen is divided into a first portion that overlaps with the track information displayed on the second screen, and a second portion that does not overlap with the track information displayed on the second screen, wherein the first portion is displayed more dimly than the second portion, and wherein the entire first cover image displayed on the first screen is displayed more dimly than the second portion of the first cover image that is displayed on the second screen.

2. The method of claim 1, wherein the displaying of the first screen comprises:

displaying the first cover image on the bottom layer of the first screen; and displaying the first track list on a top layer of the first screen.

3. The method of claim 2, wherein the first cover image is displayed more dimly than the first track list.

4. The method of claim 3, wherein the first cover image is displayed on the first screen at one or more of a low saturation level, a low brightness level and a low resolution level, in comparison with the first track list.

5. The method of claim 1, wherein the first cover image is displayed on the second screen at one or more of a saturation level, brightness level and resolution level that is identical with that of the track information.

6. The method of claim 1, wherein the displaying of the track information on the second screen discontinues after a preset time period.

7. The method of claim 1, further comprising receiving a second key input signal and displaying a second track list on a second cover image in the first screen, in response to the second key input signal.

8. The method of claim 7, wherein the second track list is displayed more clearly on the first screen than the second cover image.

9. The method of claim 8, wherein the displaying of the second track list on the second cover image comprises:

displaying the second track list on the top layer of the first screen; and displaying the second cover image on the bottom layer of the first screen, the second track list being displayed on the first screen at one or more of a high saturation level, a high brightness level and a high resolution level, in comparison with the second cover image.

10. The method of claim 7, further comprising:

selecting a track from the second track list; and displaying the second screen including track information of the selected track on the second cover image.

11. The method of claim 10, wherein the track information is displayed on the second screen on a portion of the second cover image, and the portion of the second cover image of the second screen, on which the track information is displayed, is displayed at one or more of a low saturation level, a low brightness level and a low resolution level.

12. The method of claim 10, wherein the displaying of the track information on the second screen discontinues after at least one of a discontinuation of a playing of the track and a preset time period from the initiation of the playing of the track.

13. The method of claim 12, wherein the displaying of the second cover image on the second screen is restored to one or more of a normal saturation level, a normal brightness level, and a normal resolution level on the portion on which the track information is displayed, after the displaying of the track information has discontinued.

14. A portable device displaying a cover image associated with a track, the portable device comprising:
- a display unit for displaying a first screen and a second screen, the first screen including a first track listing and a first cover image, the second screen including track information of a selected track of the first track listing and the first cover image;
- an audio processing unit for playing a track associated with the first cover image;
- a memory unit for storing the first cover image and the track; and
- a control unit for controlling the display unit to display the first screen in response to a first input signal, the first track list listing tracks associated with the first cover image, and, when a track is selected from the first track list displayed on the first cover image, to display the second screen, wherein the display unit displays the track information on a top layer of the second screen and displays the first cover image on a bottom layer of the second screen, the top layer of the second screen being smaller in size than the bottom layer of the second screen, wherein the first cover image that is displayed on the second screen is divided into a first portion that is overlapped with the track information and a second portion that is not overlapped with the track information, wherein the first portion is displayed more dimly that the second portion, and wherein the display unit displays the first screen such that entire first cover image displayed on the first screen is displayed more dimly than the second portion of the first cover image displayed on the second screen.

15. The portable device of claim 14, wherein the control unit controls the display unit to display a second cover image on the first screen and to display a second track list on the first screen in response to a second input signal.

16. The portable device of claim 15, wherein the control unit detects a selection to a track from one of the first and second track lists and controls the display unit to display the second screen with track information and a cover image corresponding to the selected track.

17. The portable device of claim 16, wherein the control unit controls the display of the track information on the second screen to be discontinued after a preset time has elapsed from a start of a playback of the selected track.

* * * * *